July 11, 1933.  H. G. BARRETT  1,918,171
METHOD OF HEATING AND STRETCHING TUBES OVER SHAFTS
Filed March 5, 1929
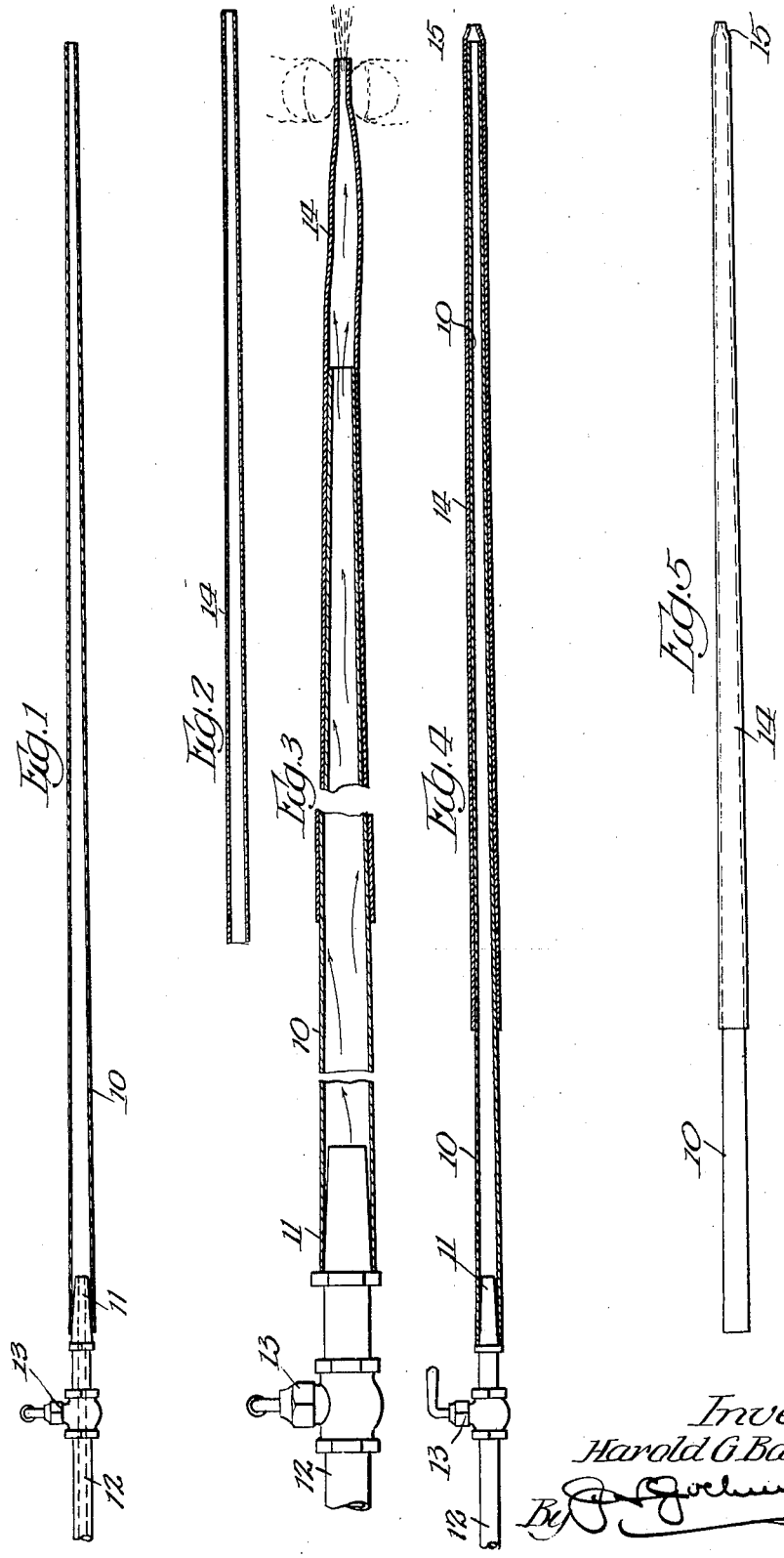
Inventor
Harold G. Barrett Patented July 11, 1933

1,918,171

UNITED STATES PATENT OFFICE

HAROLD G. BARRETT, OF WILMETTE, ILLINOIS, ASSIGNOR TO PYRATONE PRODUCTS CORPORATION, OF CHICAGO, ILLINOIS, A CORPORATION OF ILLINOIS

METHOD OF HEATING AND STRETCHING TUBES OVER SHAFTS

Application filed March 5, 1929. Serial No. 344,442.

This invention relates to an improved method of heating and stretching tubes over shafts and is particularly adapted, though not necessarily limited in its use, in applying tapered shells or casings of hard flexible non-metallic substance to tapered tubular shafts, which latter are particularly adapted, though not necessarily limited in its use, as golf club shafts.

Heretofore in order to apply casings or tubes of this character to shafts, the casing has been immersed in hot liquid or subjected to the action of steam so as to render the same soft and pliable and after being placed on the shaft, the casing is cooled so that it will shrink and tightly bind the shaft.

While the tube is soft it is very pliable and therefore quite difficult to handle, with the result that it cools considerably before it is placed upon the shaft, and furthermore it is necessary to perform the work quickly and accurately.

It is one of the objects of the present invention to overcome these difficulties and objections and to provide an improved method of heating and stretching the tube upon the shaft, thereby dispensing with the necessity of considerable handling of the casing or tube, and at the same time that the casing is being applied it is being stretched over the shaft and ironed out, thereby insuring an accurate or tight fit.

It is a further object of the present invention to employ the shaft as a mandrel which latter is heated by passing a heating fluid, such as steam, therethrough, the casing being heated by the heating fluid as it is discharged through the open end of the tube or shaft and also by heat radiated by the wall of the shaft, and as the casing is being drawn upon the shaft it is ironed out by such operation and when cooled will shrink upon the shaft. This method renders it unnecessary to handle the shaft during the operation of applying the casing or shell thereto.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which Figure 1 is a view partly in longitudinal section and partly in elevation, showing a tubular shaft having a discharge nozzle inserted into one end thereof.

Figure 2 is a longitudinal sectional view of a tapered tube or casing applied to the shaft.

Figure 3 is a view similar to Figure 1, on an enlarged scale, showing one end of the tubular casing or sleeve telescoped over the end of the shaft and also showing the method of heating both.

Figure 4 is a view similar to Figure 3, showing the casing or tube on the shaft and ironed out, one extremity of the casing or shell being constricted.

Figure 5 is an elevation of the completed article before the end of the shell or casing is trimmed off.

Referring more particularly to the drawing the numeral 10 designates generally a tubular shaft which is preferably constructed of metal and is tapered from one end to the other, both ends of the shaft being open.

The larger end of the shaft is telescoped over a nozzle 11 of suitable configuration and which nozzle is connected to a pipe 12 through which a heating medium, such as steam, is delivered from any suitable source and discharged into the shaft so as to flow therethrough to heat the shaft. The discharge of the heating medium into the shaft may be controlled in any suitable manner such as by means of a valve 13. The numeral 14 designates generally a tapering shell or casing which is of a normal internal diameter less than the corresponding external diameter of the shaft 10 upon which the casing is to be placed. This casing 14 is constructed of any suitable flexible, hard non-metallic material, such for instance as pyroxyline, celluloid or any other cellulose material.

In carrying this method into operation one end of the shaft 10 is first telescoped over the nozzle 11, the free end of the shaft is then inserted or telescoped into the larger end of the shell or casing 14. The valve 13 is then opened and the heating medium is discharged through the shaft 10 and into the portion of the casing 14 which projects beyond the end of the shaft.

The casing 14 being constructed of flexible, hard non-metallic material will become pliable under the action of the heating medium, the portion of the casing beyond the end of the shaft being subjected directly to the action of the heating medium as it is delivered from the end of the shaft while the portion of the casing which telescopes over the end of the shaft will be heated by radiation from the portion of the shaft with which it contacts.

As soon as the casing 14 has become sufficiently pliable it is drawn upon the shaft preferably by the hands of the operator and such operation serves to advance the casing upon the shaft, at the same time stretching the casing, and the continued operation of drawing the casing upon the shaft by the hands of the operator passing over the casing in a direction from one end of the shaft towards the other will result in smoothing the casing and ironing out any wrinkles or any unevenness which might exist in the casing and caused by the drawing of the casing upon the shaft.

When the casing has been thus placed upon the shaft, the supply of the heating medium may be cut off by operating the valve 13, after which the shaft 10 is removed from the nozzle 11 or vice versa.

The casing and shaft are then allowed to cool, or if desired the cooling may be forced and the casing 14 will as it is cooled contract or shrink upon the shaft thereby tightly gripping the shaft and secure the casing and shaft against longitudinal movement one with respect to the other or for other relative movements.

If the casing is not entirely drawn upon the shaft 10, the extremity 15 thereof will be constricted and this constricted portion 15, as well as any other desired amount of the adjacent end of the casing, may be trimmed off.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A method of applying a thermoplastic casing to a hollow shaft and upon which shaft the casing is to remain, which consists in telescoping one end of the shaft into one end of the casing, then discharging a heating medium through the shaft and into the portion of the casing beyond the end of the shaft to heat the casing to render the latter pliable, and then drawing the casing while heated, upon the shaft.

2. A method of applying a thermoplastic casing to a hollow shaft and upon which shaft the casing is to remain which consists in telescoping one end of the shaft into one end of the casing, then discharging a heating medium through the shaft and into the portions of the casing beyond the end of the shaft to heat the casing to render the latter pliable, then drawing the casing while heated, upon the shaft, and then cooling the casing to shrink it upon the shaft.

3. A method of applying a tapered thermoplastic casing to a hollow tapered shaft and upon which shaft the casing is to remain which consists in telescoping one end of the shaft into one end of the casing, then discharging a heating medium through the shaft and into the portions of the casing beyond the end of the shaft to heat the casing to render the latter pliable, and then drawing the casing while heated, upon the shaft.

4. A method of stretching and applying a tubular thermoplastic casing of flexible hard non-metallic material to a hollow shaft and upon which shaft the casing is to remain which consists in utilizing the shaft as a mandrel, telescoping one end of the mandrel into one end of the casing, heating the mandrel by passing a heating medium therethrough, stretching the casing by drawing the same upon the mandrel and as the casing is heated by the mandrel and the said heating medium, then cooling the casing to cause it to shrink upon the shaft, and then cutting off the extremity of the casing which projects beyond one end of the shaft.

5. A method of stretching and applying a tubular thermoplastic casing of flexible hard non-metallic material to a hollow shaft and upon which shaft the casing is to remain which consists in utilizing the shaft as a mandrel, telescoping one end of the mandrel into one end of the casing, heating the mandrel by passing a heating medium therethrough, stretching the casing by drawing the same upon the mandrel and as the casing is heated by the mandrel and the said heating medium, and then cooling the casing to cause it to shrink upon the shaft, the normal interior diameter of the casing being less than the normal exterior diameter of the corresponding portion of the shaft.

6. A method of stretching and applying a tubular casing of pyroxyline to a hollow shaft and upon which shaft the casing is to remain which consists in utilizing the shaft as a mandrel, telescoping one end of the mandrel into one end of the casing, heating the mandrel by passing a heating medium therethrough, stretching the casing by drawing the same upon the mandrel and as the casing is heated by the mandrel and the said heating medium, and then cooling the casing to cause it to shrink upon the shaft.

7. A method of stretching and applying a tubular thermoplastic casing to a hollow shaft and upon which shaft the casing is to remain which consists in inserting one end of the shaft into one end of the casing, discharging a heating medium through the shaft and through the portion of the casing which projects beyond the end of the shaft to render the casing pliable, then stretching the casing to fit the shaft, by drawing the casing upon the shaft while both are being thus heated, and ironing the casing substantially smooth upon the shaft.

8. A method of stretching and applying a tubular thermoplastic casing to a hollow shaft and upon which shaft the casing is to remain which consists in inserting one end of the shaft into one end of the casing, discharging a heating medium through the shaft and through the portion of the casing which projects beyond the end of the shaft to render the casing pliable, then stretching the casing to fit the shaft, by drawing the casing upon the shaft, and ironing out the wrinkles therein by the hands of the operator as the casing is being thus drawn upon the shaft.

9. A method of stretching and applying a tubular thermoplastic casing to a hollow shaft and upon which shaft the casing is to remain which consists in inserting one end of the shaft into one end of the casing, discharging a heating medium through the shaft and through the portion of the casing which projects beyond the end of the shaft to render the casing pliable, then stretching the casing to fit the shaft, by drawing the casing upon the shaft while both are being thus heated, ironing the casing substantially smooth upon the shaft, and then shrinking the casing upon the shaft.

10. A method of stretching and applying a tubular thermoplastic casing upon a tubular shaft and upon which shaft the casing is to remain and which casing is normally of an internal diameter less than the external diameter of the corresponding portion of the shaft, which consists in employing the shaft as a mandrel, telescoping one end of the shaft into one end of the casing so that a portion of the casing will project beyond one end of the shaft, inserting a nozzle into the other end of the shaft, discharging a heating medium through the nozzle through the shaft and into the casing to render the latter pliable, and then working the casing onto and over the shaft with the hands while the casing is pliable and while the heating fluid is being discharged thereinto.

11. A method of stretching and applying a tubular thermoplastic casing upon a tubular shaft and upon which shaft the casing is to remain and which casing is normally of an internal diameter less than the external diameter of the corresponding portion of the shaft, which consists in employing the shaft as a mandrel, telescoping one end of the shaft into one end of the casing so that a portion of the casing will project beyond one end of the shaft, inserting a nozzle into the other end of the shaft, discharging a heating medium through the nozzle through the shaft and into the casing to render the latter pliable, then working the casing onto and over the shaft with the hands while the casing is pliable, rubbing the casing with the hands to smooth or iron out the wrinkles therein as the casing is being and after it has been applied, and then shrinking the casing.

12. A method of stretching and applying a thermoplastic casing to a hollow shaft and upon which shaft the casing is to remain and which casing is of a normal internal diameter less than the external diameter of the corresponding portion of the shaft, which consists in employing the shaft as a mandrel, telescoping one end of the mandrel into one end of the casing so that the casing will project beyond said end of the shaft, then discharging a heating medium into and through the shaft into the portion of the casing which is beyond the end of the shaft to render said portion of the casing pliable by the direct application of the heating medium on the interior thereof and the remaining portion of the casing pliable by the radiation of heat from the portion of the shaft inserted into the casing, and then drawing or working the casing upon the shaft.

13. A method of stretching and applying a casing to a hollow shaft and upon which shaft the casing is to remain and which casing is of a normal internal diameter less than the external diameter of the corresponding portion of the shaft, which consists in employing the shaft as a mandrel, telescoping one end of the mandrel into one end of the casing so that the casing will project beyond said end of the shaft, then discharging a heating medium into and through the shaft into the portion of the casing which is beyond the end of the shaft to render said portion of the casing pliable by the direct application of the heating medium on the interior thereof and the remaining portion of the casing pliable by the radiation of heat from the portion of the shaft inserted into the casing, and then drawing or working the casing upon the shaft, said casing being constructed of pyroxyline.

14. A method of stretching and applying a thermoplastic casing to a hollow shaft and upon which shaft the casing is to remain and which casing is of a normal internal diameter less than the external diameter of the corresponding portion of the shaft, which consists in employing the shaft as a mandrel, telescoping one end of the mandrel into one end of the casing so that the casing will project beyond said end of the shaft, then discharging a heating medium into and through the shaft into the portion of the casing which is beyond the end of the shaft to render said portion of the casing pliable by the direct application of the heating medium on the interior thereof and the remaining portion of the casing pliable by the radiation of heat from the portion of the shaft inserted into the casing, then drawing or working the casing upon the shaft, and then smoothing or ironing out the wrinkles in the casing while the casing is still pliable.

15. A method of stretching and applying a thermoplastic casing to a hollow shaft and upon which shaft the casing is to remain and which casing is of a normal internal diameter less than the external diameter of the corresponding portion of the shaft, which consists in employing the shaft as a mandrel, telescoping one end of the mandrel into one end of the casing so that the casing will project beyond said end of the shaft, then discharging a heating medium into and through the shaft into the portion of the casing which is beyond the end of the shaft to render said portion of the casing pliable by the direct application of the heating medium on the interior thereof and the remaining portion of the casing pliable by the radiation of heat from the portion of the shaft inserted into the casing, then drawing or working the casing upon the shaft, then smoothing or ironing out the wrinkles in the casing while the casing is still pliable, then cooling the casing to cause the same to shrink upon the shaft, and then cutting off any portion of the casing which projects beyond the end of the shaft.

In testimony whereof I have signed my name to this specification, on this 26th day of February, A. D. 1929.

HAROLD G. BARRETT.